US012767501B2

(12) United States Patent
Bacon et al.

(10) Patent No.: US 12,767,501 B2
(45) Date of Patent: Oct. 20, 2026

(54) LIFT ASSEMBLY

(71) Applicant: Herkules Equipment Corporation, Walled Lake, MI (US)

(72) Inventors: Todd John Bacon, Northville, MI (US); Eliana Virginia Podolski Bacon, Northville, MI (US); Scott Francis Wilhelm, Brighton, MI (US); Richard Alan Paul Casing, III, Redford, MI (US)

(73) Assignee: Herkules Equipment Corporation, Walled Lake, MI (US)

( * ) Notice: Subject to any disclaimer, the term of this patent is extended or adjusted under 35 U.S.C. 154(b) by 344 days.

(21) Appl. No.: 18/435,306

(22) Filed: Feb. 7, 2024

(65) Prior Publication Data

US 2024/0262660 A1 Aug. 8, 2024

Related U.S. Application Data

(60) Provisional application No. 63/443,754, filed on Feb. 7, 2023.

(51) Int. Cl.
*B66F 3/22* (2006.01)
*B66F 3/44* (2006.01)

(52) U.S. Cl.
CPC . *B66F 3/22* (2013.01); *B66F 3/44* (2013.01)

(58) Field of Classification Search
CPC .... B66F 3/22; B66F 3/44; B66F 7/065; B66F 7/0666
See application file for complete search history.

(56) References Cited

U.S. PATENT DOCUMENTS 907,176 A 12/1908 Richardson
1,882,069 A 10/1932 Ekstromer
(Continued)

FOREIGN PATENT DOCUMENTS

CN 211169687 U 8/2020
EP 1375410 A1 1/2004
(Continued)

OTHER PUBLICATIONS

English language abstract for JPH 09-46969 A extracted from espacenet. com database on Aug. 14, 2024, 1 page.
(Continued)

*Primary Examiner* — Seahee Hong
(74) *Attorney, Agent, or Firm* — Howard & Howard Attorneys PLLC

(57) ABSTRACT

A lift assembly includes a base, a platform moveable relative to the base between raised and lowered positions, and a scissor mechanism to move the platform relative to the base. The lift assembly also includes a lift mechanism including a base support coupled to the base and extending from the base toward the platform, a platform support mounted to the platform and extending from the platform toward the base, a first linkage supported by the base support and coupled to the platform support, and a first pulley supported by the first linkage. The lift assembly also includes a drive mechanism supported by the base and a cable extending from the drive mechanism, wrapped at least partially around the first pulley, and fixed relative to the platform support. The cable is configured to be tensioned by the drive mechanism such that the lift mechanism moves the platform to the raised position.

20 Claims, 10 Drawing Sheets

(56) References Cited

U.S. PATENT DOCUMENTS

| | | | | |
|---|---|---|---|---|
| 2,463,349 | A | 3/1949 | Baner | |
| 3,168,665 | A | 2/1965 | Holper | |
| 3,785,462 | A * | 1/1974 | Coad | B66F 7/065 187/269 |
| 4,024,972 | A | 5/1977 | Hobson | |
| 4,457,403 | A | 7/1984 | Ream | |
| 5,111,907 | A * | 5/1992 | Kishi | B66F 11/04 182/127 |
| 8,662,477 | B2 | 3/2014 | Bacon | |
| 8,708,089 | B2 | 4/2014 | Kitahata et al. | |
| 8,714,524 | B2 | 5/2014 | Bacon | |
| 8,733,508 | B2 | 5/2014 | Bacon | |
| 9,422,142 | B2 | 8/2016 | Bacon et al. | |
| 11,655,100 | B2 | 5/2023 | Scarth | |
| 12,358,767 | B2 | 7/2025 | Bacon et al. | |
| 2010/0012909 | A1 | 1/2010 | Lee | |
| 2014/0103277 | A1 | 4/2014 | Cormack | |
| 2019/0047832 | A1 * | 2/2019 | Ooe | B66F 3/22 |
| 2023/0286793 | A1 | 9/2023 | Bafile | |
| 2023/0382698 | A1 * | 11/2023 | Bacon | B66F 7/065 |
| 2023/0383815 | A1 | 11/2023 | Bacon et al. | |
| 2024/0084878 | A1 * | 3/2024 | Bacon | B66F 7/065 |
| 2025/0223141 | A1 | 7/2025 | Dahlberg et al. | |

FOREIGN PATENT DOCUMENTS

| | | | |
|---|---|---|---|
| GB | 764005 | A | 12/1956 |
| JP | H0946969 | A | 2/1997 |

OTHER PUBLICATIONS

International Search Report for Application No. PCT/US2025/020251 dated Jul. 15, 2025, 2 pages.

* cited by examiner

LIFT ASSEMBLY

CROSS-REFERENCE TO RELATED APPLICATIONS

The subject patent application claims priority to and all the benefits of U.S. Provisional Patent Application No. 63/443,754, which was filed on Feb. 7, 2023, and which is herein incorporated by reference in its entirety.

BACKGROUND OF THE INVENTION

1. Field of the Invention

The invention generally relates to a lift assembly.

2. Description of the Related Art

Lift assemblies commonly include a base, a platform moveable relative to the base, and a scissor mechanism having a first pair of scissor arms and a second pair of scissor arms. The first pair of scissor arms and the second pair of scissor arms typically pivot to permit the platform to move. The lift assemblies also commonly include a drive mechanism which moves the scissor mechanism. More specifically, the drive mechanism typically moves the first pair of scissor arms and the second pair of scissor arms themselves. However, these lift assemblies thus require specialized constructions of the first and second pair of scissor arms, adding cost and manufacturing time.

As such, there remains a need to provide an improved lift assembly.

SUMMARY OF THE INVENTION AND ADVANTAGES

The present invention provides a lift assembly including a base, a platform moveable relative to the base between a raised position and a lowered position, and a scissor mechanism coupled to the base and to the platform to move the platform relative to the base. The lift assembly also includes a lift mechanism coupled to the base and the platform to move the platform to the raised position. The lift mechanism includes a base support coupled to the base and extending from the base toward the platform. The lift mechanism also includes a platform support mounted to the platform and extending from the platform toward the base. The lift mechanism further includes a first linkage supported by the base support and coupled to the platform support, and a first pulley supported by the first linkage. The lift assembly also includes a drive mechanism supported by the base and a cable extending from the drive mechanism, wrapped at least partially around the first pulley, and fixed relative to the platform support. The cable is configured to be tensioned by the drive mechanism such that the lift mechanism moves the platform to the raised position.

There has thus been outlined, rather broadly, certain features of embodiments of the invention in order that the detailed descriptions thereof may be better understood, and in order that the present contribution to the art may be better appreciated. Additional or alternative features of embodiments of the invention are described in further detail below.

In this respect, before explaining embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

To accomplish the above and related objects, the invention may be embodied in the forms illustrated in the accompanying drawings, attention being called to the fact, however, that the drawings are illustrative only, and that changes may be made in the specific constructions illustrated. Moreover, it is to be noted that the accompanying drawings are not necessarily drawn to scale or to the same scale. In particular, the scale of some of the elements of the drawings may be exaggerated to emphasize characteristics of the elements.

BRIEF DESCRIPTION OF THE DRAWINGS

Other advantages of the present invention will be readily appreciated, as the same becomes better understood by reference to the following detailed description when considered in connection with the accompanying drawings.

Figure 1:
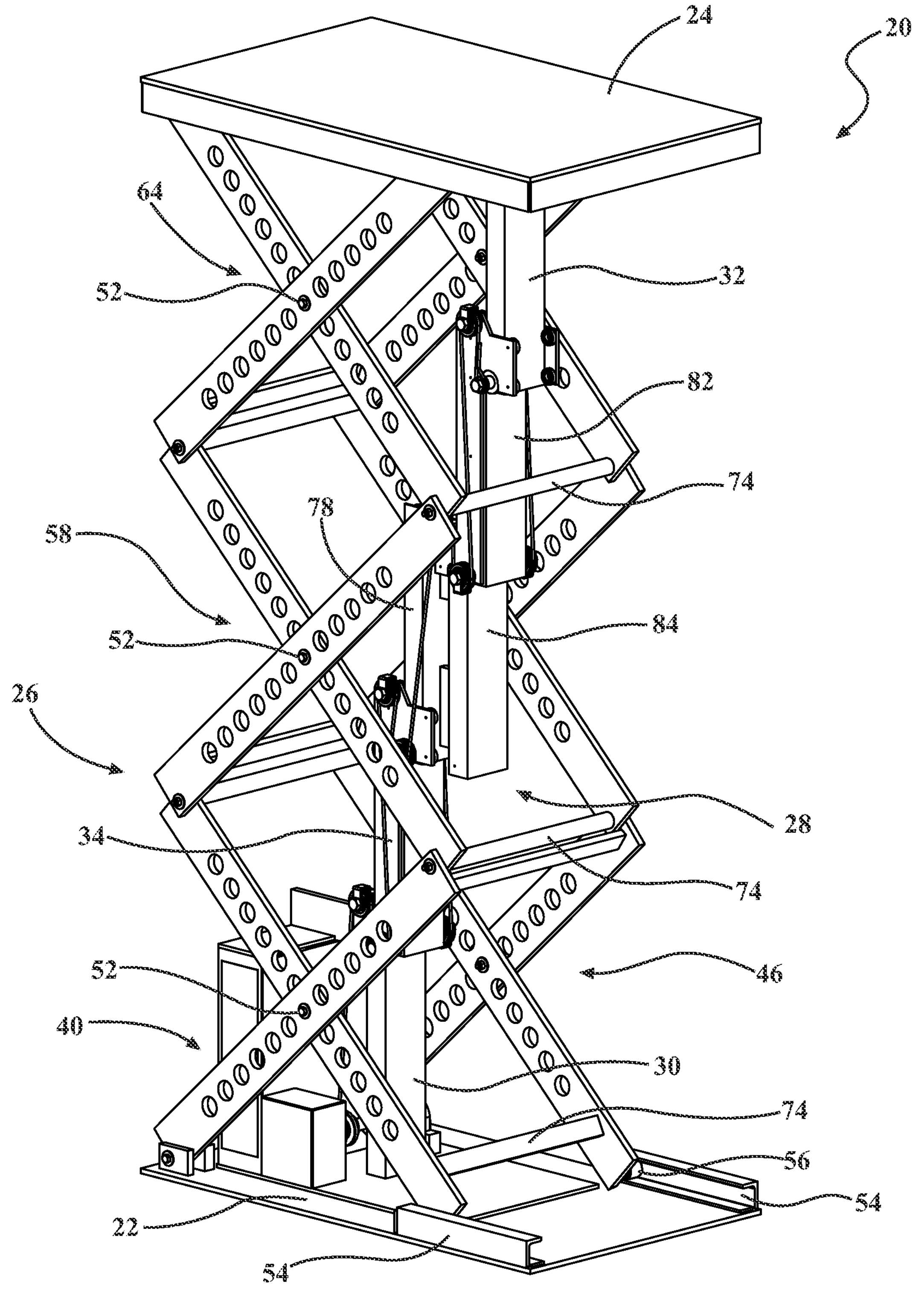
FIG. 1 is a perspective view of a lift assembly in a raised position.

While the invention is susceptible to various modifications and alternative forms, specific embodiments thereof are shown by way of example in the drawings and may herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

Figure 2:
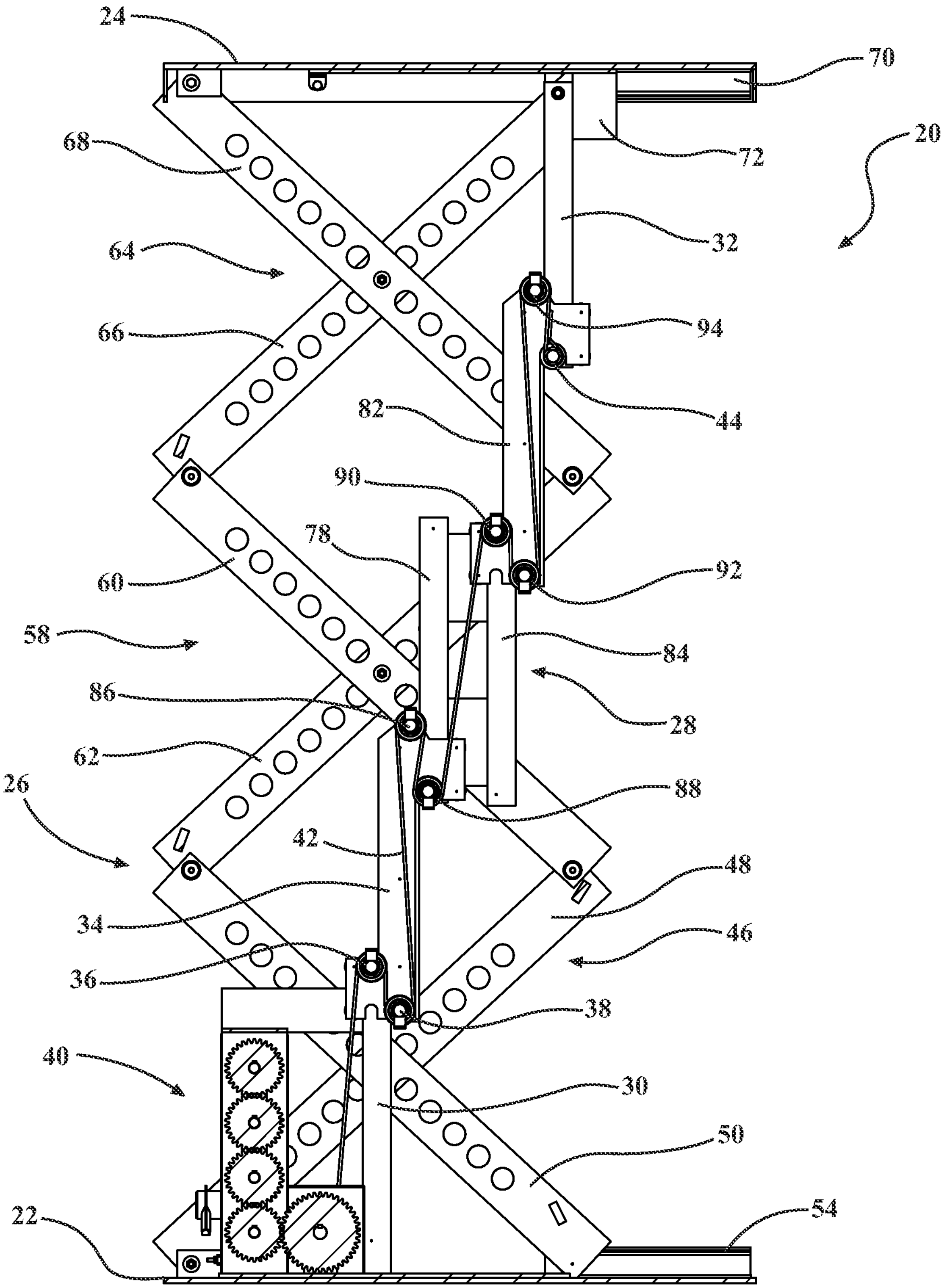
FIG. 2 is a side perspective view of the lift assembly of FIG. 1.
Figure 3:
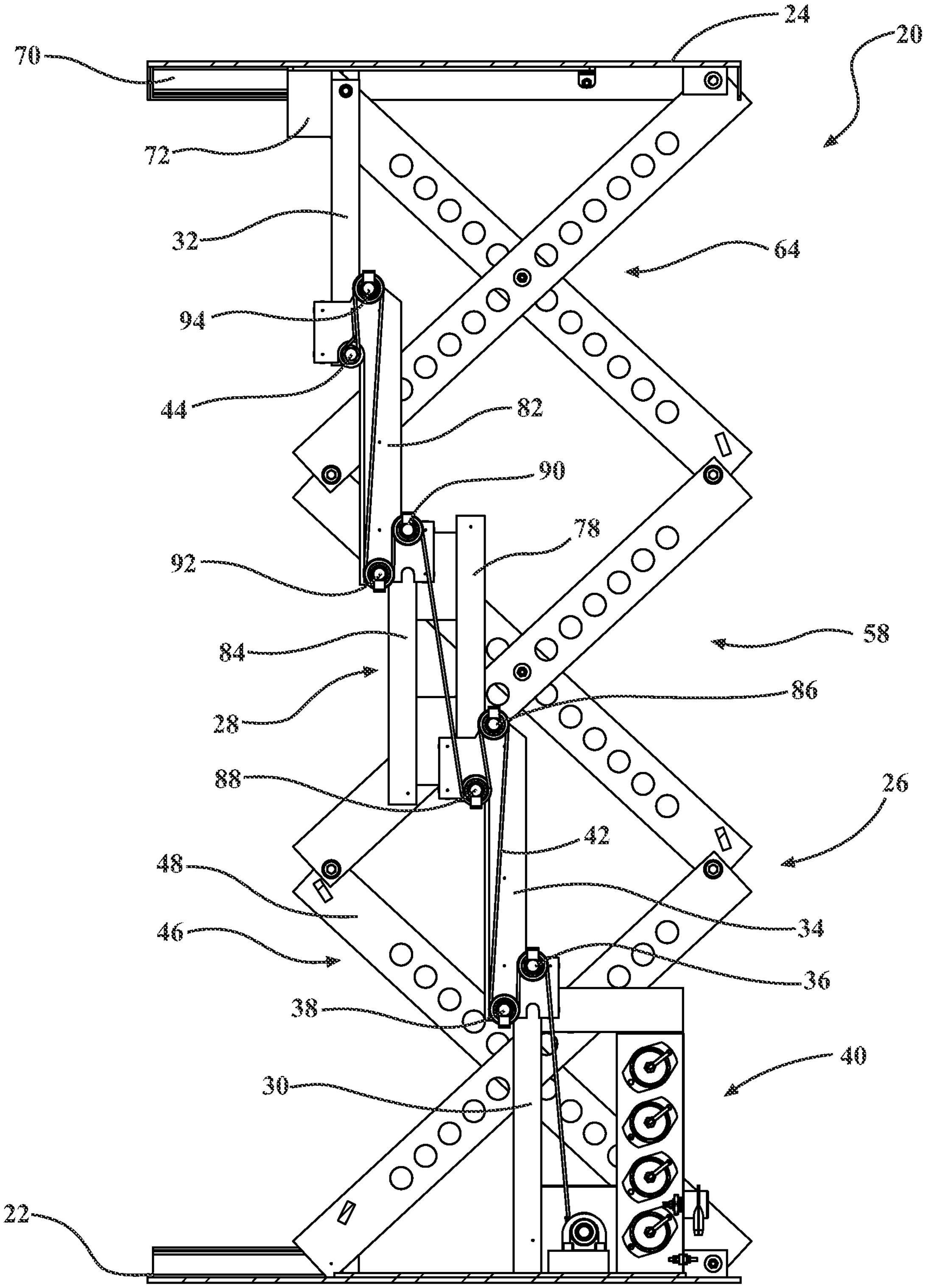
FIG. 3 is another side perspective view of the lift assembly of FIGS. 1 and 2.
Figure 4:
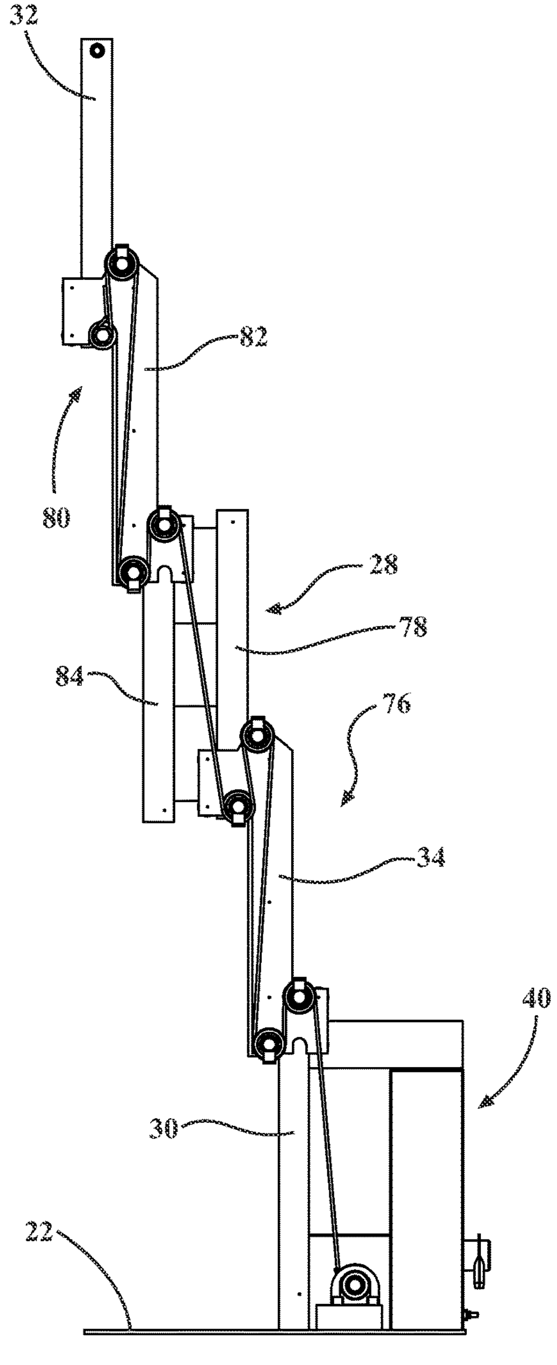
FIG. 4 is a side perspective view of an upper slide assembly and a lower slide assembly in an extended configuration.
Figure 5:
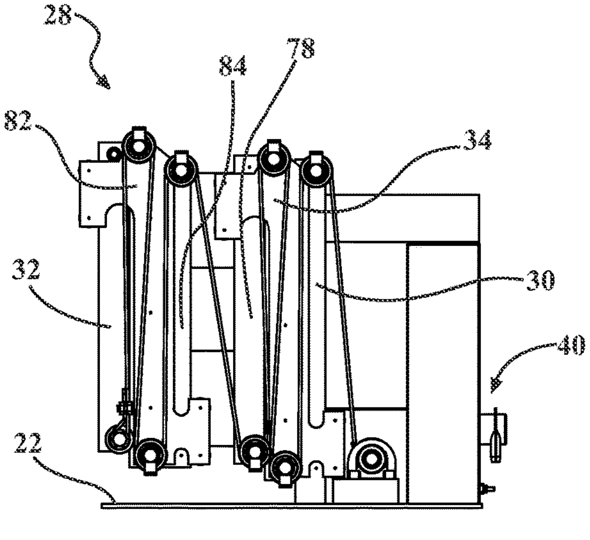
FIG. 5 is a side perspective view of the upper slide assembly and the lower slide assembly of FIG. 4 in a collapsed configuration.
Figure 10:
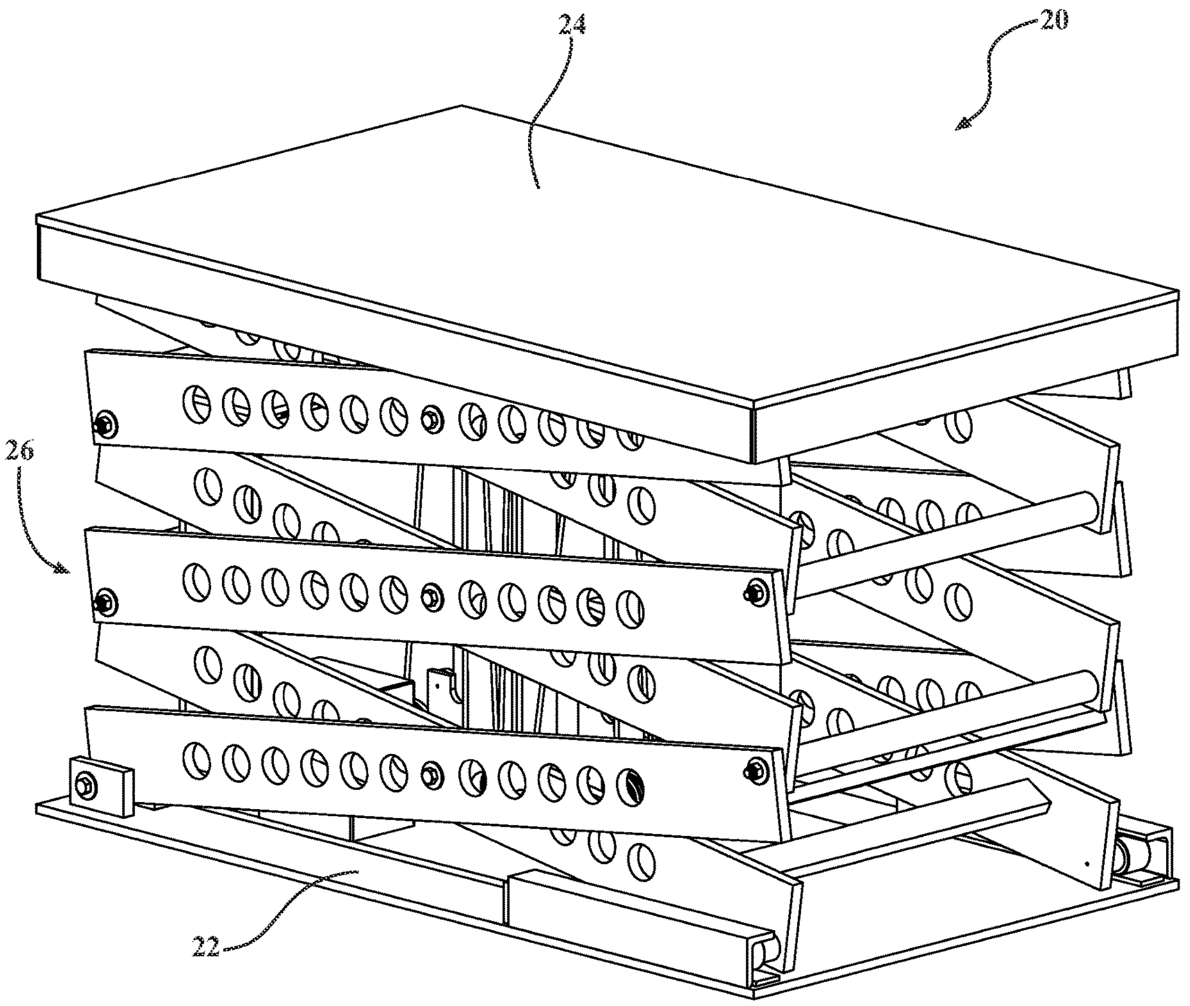
FIG. 10 is a perspective view of the lift assembly in a lowered position.
Figure 11:
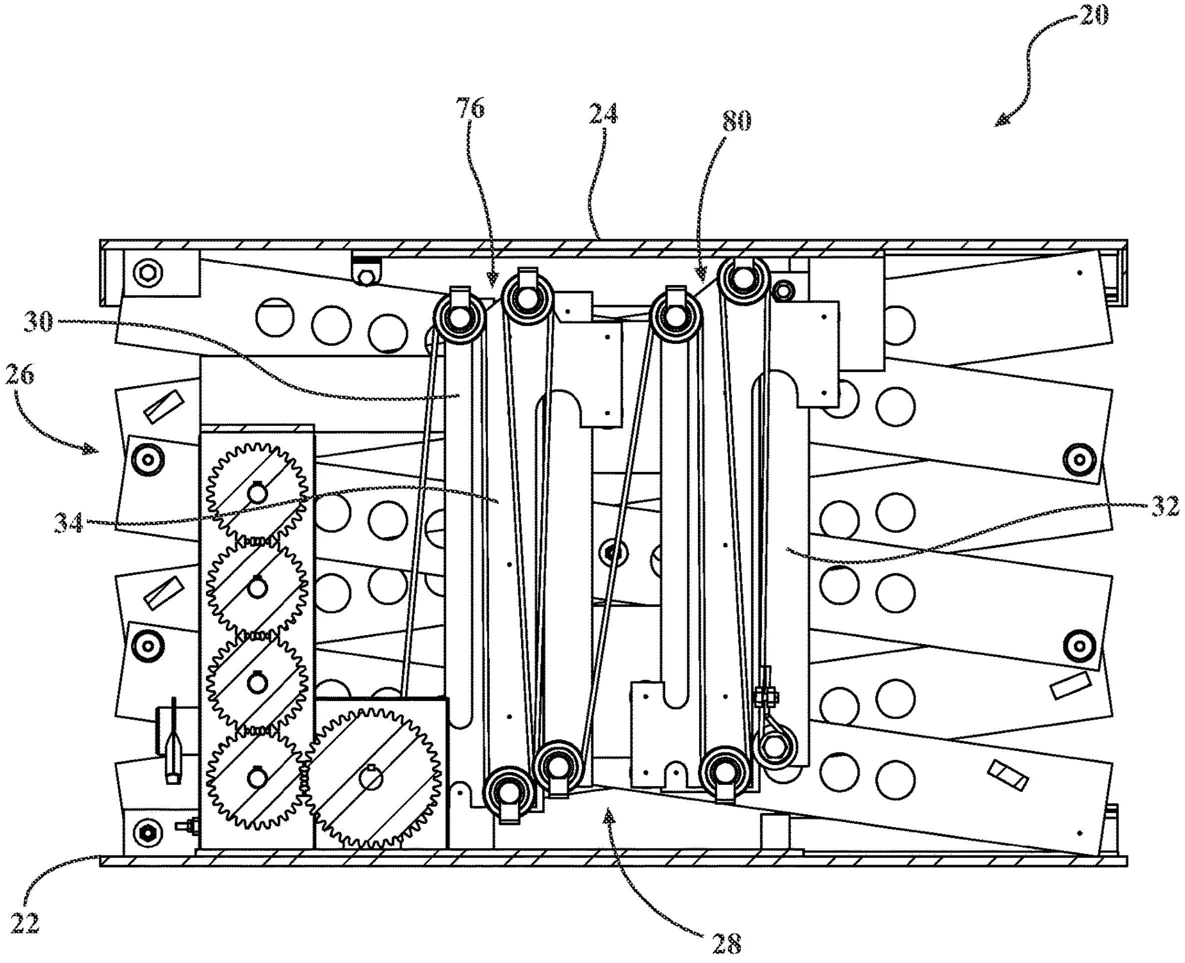
FIG. 11 is a side cross-sectional view of the lift assembly of FIG. 10.
Figure 12:
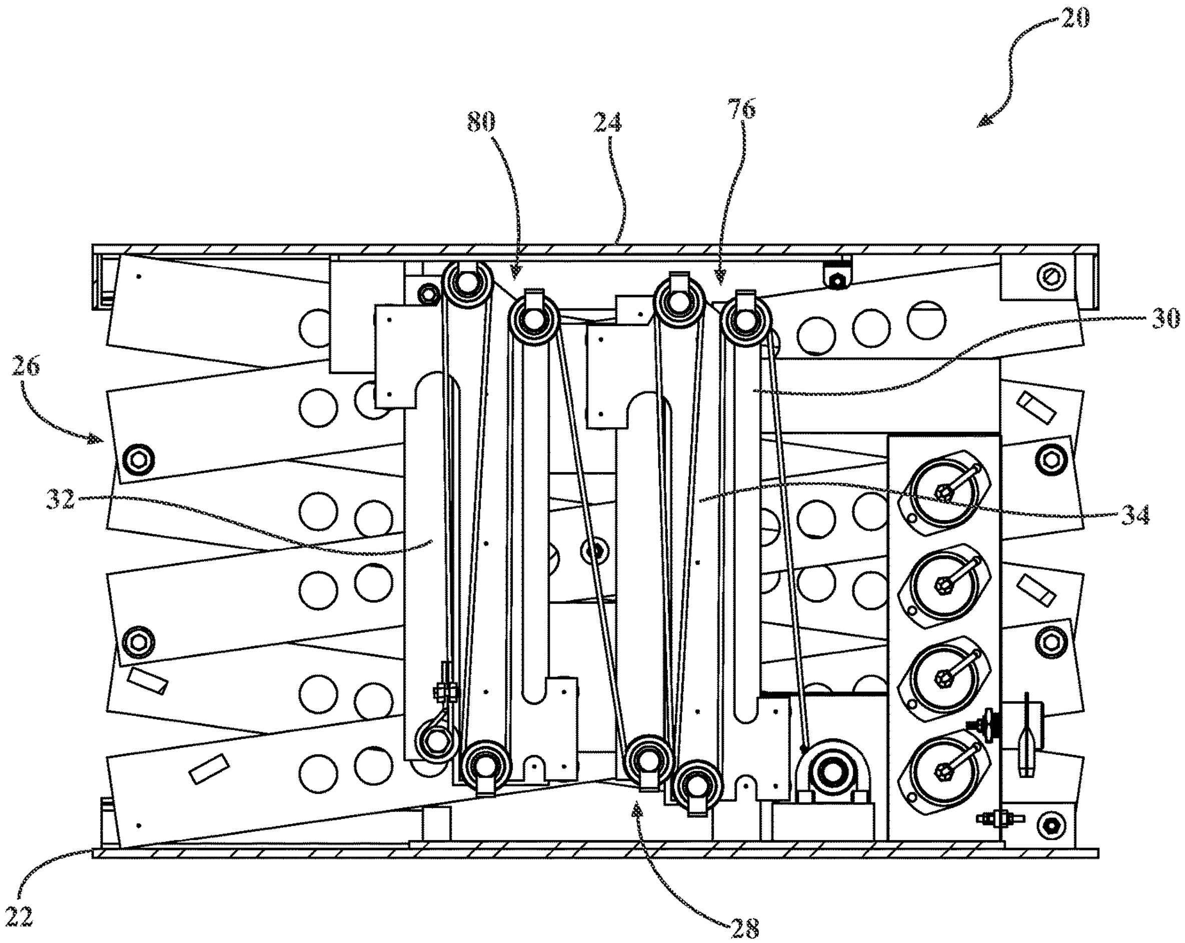
FIG. 12 is another side cross-sectional view of the lift assembly of FIG. 10.
Figure 14:
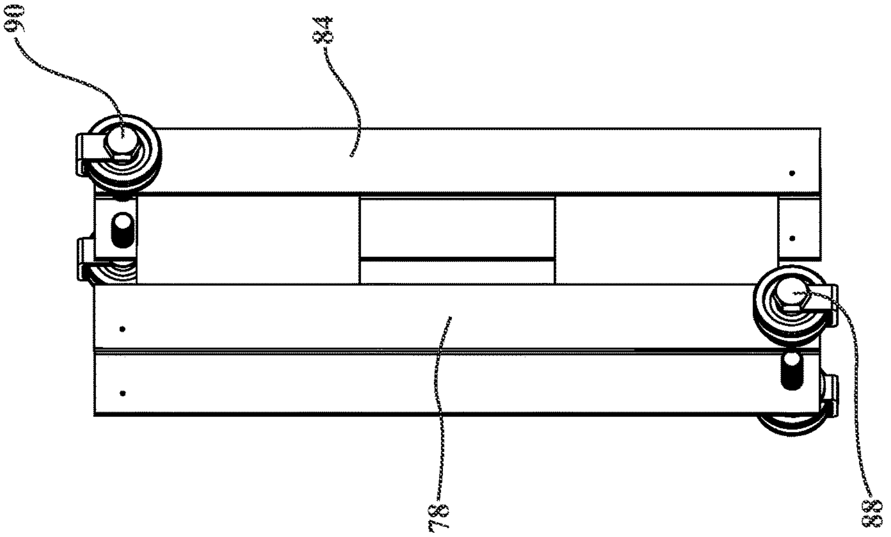
FIG. 14 is a perspective view of an intermediate support of the lift assembly.
Figure 13:
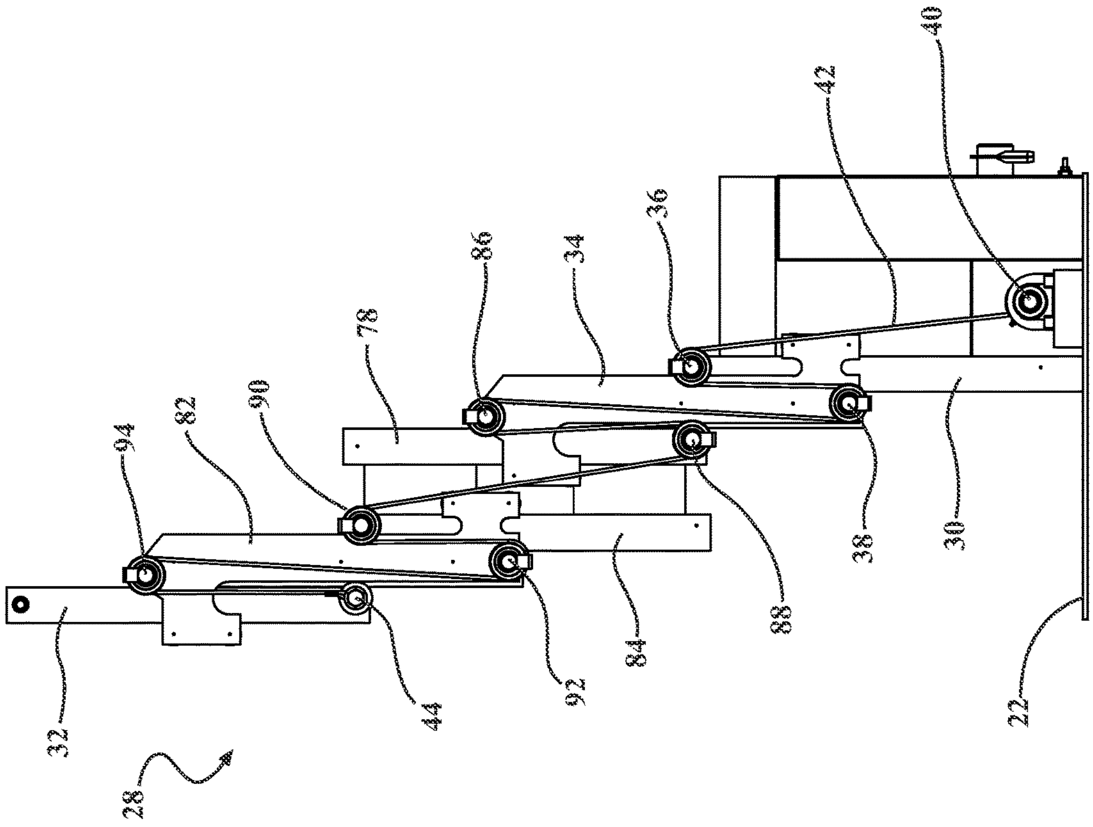
FIG. 13 is a perspective view of the lift assembly between the lowered position and the raised position.

With reference to the Figures, wherein like numerals indicate like parts throughout the several views, a lift assembly 20 is shown in FIGS. 1-14. As shown in FIGS. 1-3 and 10-12, the lift assembly 20 includes a base 22, a platform 24 moveable relative to the base 22 between a raised position (as shown in FIGS. 1-3) and a lowered position (as shown in FIGS. 10-12), and a scissor mechanism 26 coupled to the base 22 and to the platform 24 to move the platform 24 relative to the base 22. The lift assembly 20 also includes a lift mechanism 28 coupled to the base 22 and the platform 24 to move the platform 24 to the raised position. An intermediate position between the raised position and the lowered position is shown in FIG. 13. The lift mechanism 28 includes a base support 30 coupled to the base 22 and extending from the base 22 toward the platform 24. The lift mechanism 28 also includes a platform support 32 mounted to the platform 24 and extending from the platform 24 toward the base 22. The lift mechanism 28 further includes a first linkage 34 supported by the base support 30 and coupled to the platform support 32, and a first pulley 36 supported by the first linkage 34. The lift assembly 20 also includes a drive mechanism 40 supported by the base 22 and a cable 42 extending from the drive mechanism 40, wrapped at least partially around the first pulley 36, and fixed relative to the platform support 32. The cable 42 is configured to be tensioned by the drive mechanism 40 such that the lift mechanism 28 moves the platform 24 to the raised position.

Although not required, the cable 42 may be fixed to the platform support 32 at a fixation point 44, and the cable 42 may extend from the fixation point 44 toward the platform 24. The platform 24 moves along a vertical axis in a first direction to the raised position and in a second direction to the lowered position. The cable 42 is configured to exert a force on the platform support 32 in the first direction when tensioned. More specifically, the cable 42 may exert a force on the fixation point 44 of the platform support 32. The fixation point 44 may be further defined as a projection 44 which the cable 42 at least partially wraps around. The lift mechanism 28 may 28 may be capable of holding the platform 24 in the raised position without assistance from the scissor mechanism 26.

The lift mechanism 28 has a collapsed configuration associated with the lowered position of the platform 24, see FIGS. 5 and 10-12. The lift mechanism 28 also has an extended configuration associated with the raised position of the platform 24, see FIGS. 1-4, and the lift mechanism 28 also has any number of intermediate configurations associated with the intermediate position, one of which is shown in FIG. 13. In the collapsed configuration, at least one of the platform support 32 and the base support 30 are adjacent to the first linkage 34. In the extended configuration, the platform support 32, the base support 30, and the first linkage 34 are spaced from one another between the base 22 and the platform 24. As a non-limiting example, the collapsed configuration may telescope.

The lift mechanism 28 may further include a second pulley 38 supported by the first linkage 34 and a third pulley 86 supported by the first linkage 34. The cable 42 may wrap at least partially around the second pulley 38 and the third pulley 86. The base 22 preferably extends along a longitudinal axis, and the first pulley 36, the second pulley 38, and the third pulley 86 are preferably be spaced from one another along the longitudinal axis such that the second pulley 38 is disposed axially along the longitudinal axis between the first pulley 36 and the third pulley 86. It is to be appreciated that, in the embodiments with three or more pulleys, the first pulley 36 is preferably supported by the base support 30.

The cable 42 may extend from the drive mechanism 40 toward the first pulley 36, wrap at least partially around the first pulley 36 and extend toward the second pulley 38, wrap at least partially around the second pulley 38 and extend toward the third pulley 86, and then wrap at least partially around the third pulley 86. Although not required, the cable 42 may then extend from the third pulley 86 toward the platform support 32. When the platform 24 is in the raised position, the cable 42 is tensioned by the drive mechanism 40, thus biasing the platform support 32 away from the base support 30 and supporting the platform 24 in the raised position. It is to be appreciated that the platform 24 may be considered to be "locked" in the raised position by the lift mechanism 28 when the cable 42 is tensioned.

The lift mechanism 28 may further include a second linkage 82 supported by the platform support 32 and coupled to the base support 30 and the first linkage 34. The lift mechanism 28 may further include a sixth pulley 92 supported by the second linkage 82 and a seventh pulley 94 supported by the second linkage 82. The cable 42 may wrap at least partially around the sixth pulley 92 and the seventh pulley 94. More specifically, the cable 42 may extend from the seventh pulley 94, away from the platform 24, and toward the platform support 32 where the cable is fixed to the platform support 32 at the fixation point 44. As described herein, the platform 24 moves along a vertical axis in a first direction to the raised position and in a second direction to the lowered position, and the cable 42 is configured to exert a force on the second linkage 82 in the first direction when tensioned.

The lift mechanism 28 may further include an intermediate support 78, as best shown in FIGS. 1-5 and 14. The intermediate support 78 may be supported by the first linkage 34 and the second linkage 82. The lift mechanism 28 may also further include a fourth pulley 88 supported by the intermediate support 78 and a fifth pulley 90 supported by the intermediate support 78. The cable 42 may wrap at least partially around the fourth pulley 88 and the fifth pulley 90. In the collapsed configuration of the lift mechanism 28, the base support 30, the first linkage 34, the second linkage 82, and the intermediate support 78 are spaced from one another between the 22 and the platform 24. In the extended configuration, the base support 30, the first linkage 34, the second linkage 82, and the intermediate support 78 are spaced from one another between the base 22 and the platform 24. The cable 42 may be configured to exert a force on the intermediate support 78 in the first direction when tensioned.

The intermediate support 78 may be further defined as a first intermediate support 78 and a second intermediate support 84. The fourth pulley 88 may be supported by the first intermediate support 78 and the fifth pulley 90 may be supported by the second intermediate support 84. The first intermediate support 78 may be fixed to the second intermediate support 84.

The scissor mechanism 26 preferably includes a pair 46 of opposing scissor supports 48, 50 pivotable about a pivot point 52 which optionally may be central to the pair 46 of opposing scissor supports 48, 50. One of the scissor supports 48 may be fixed relative to the base 22 and the other of the scissor supports 50 may be moveable relative to the base 22. In a non-limiting example, the base 22 includes a track 54, and the other of the scissor supports 50 includes a wheel 56 moveable along the track 54 to pivot the opposing pair of scissor supports 48, 50 about the pivot point 52. The pair 46 of opposing scissor supports 48, 50 may be further defined as a first pair 46 of opposing scissor supports 48, 50, and the scissor mechanism 26 may also include a second pair 58 of opposing scissor supports 60, 62. One of the scissor supports 60 of the second pair 58 may be pivotably coupled to one of the scissor supports 48 of the first pair 46, and the other of the scissor supports 62 of the second pair 58 may be pivotably coupled to the other of the scissor supports 50 of the first pair 46. The scissor mechanism 26 may further include a third pair 64 of opposing scissor supports 66, 68, with one of the scissor supports 66 of the third pair 64 pivotably coupled to one of the scissor supports 60 of the second pair 58, and the other scissor support 68 of the third pair 64 pivotably coupled to the other scissor support 62 of the second pair 58. It is further to be appreciated that four pairs, five pairs, or more than five pairs of opposing scissor supports are also contemplated.

The most proximate pair of opposing scissor supports 48, 50 to the platform 24—be it the first pair 46, the second pair 58, the third pair 64, the fourth pair, the fifth pair, etc.—may have one of the scissor supports 48, 50, 60, 62, 66, 68 fixed relative to the platform 24 and the other of the scissor supports 48, 50, 60, 62, 66, 68 moveable relative to the platform 24. In a non-limiting example, the platform 24 includes a second track 70, and the other of the scissor supports 48, 50, 60, 62, 66, 68 includes a second wheel 72 moveable along the second track 70 to pivot the pair of opposing scissor supports 48, 50, 60, 62, 66, 68 about the pivot point 52. It is further to be appreciated that the lift assembly 20 may be approximately symmetrical. In other words, as shown in FIG. 1, the lift assembly 20 may include a duplicate of the first pair 46 of opposing scissor supports 48, 50 as described herein, and optionally may include a duplicate of the second pair 58 of opposing scissor supports 60, 62 as described herein, and optionally may include a duplicate of the third pair 64 of opposing scissor supports 66, 68 as described herein. The duplicate of the first pair 46 of opposing scissor supports 48, 50 may be coupled to the first pair 46 of opposing scissor supports 48, 50 through one or more stabilizing bar(s) 74, the duplicate of the second pair 58 of opposing scissor supports 60, 62 may be coupled to the second pair 58 of opposing scissor supports 60, 62 through one or more stabilizing bar(s) 74, and the duplicate of the third pair 64 of opposing scissor supports 66, 68 may be coupled to the third pair 64 of opposing scissor supports 66, 68 through one or more stabilizing bar(s) 74. The stabilizing bar 74 may pivotably couple the first pair 46 of opposing scissor supports 48, 50 to the second pair 58 of opposing scissor supports 60, 62, and the stabilizing bar 74 may pivotably couple the second pair 58 of opposing scissor supports 60, 62 to the third pair 64 of opposing scissor supports 66, 68.

Figure 6:
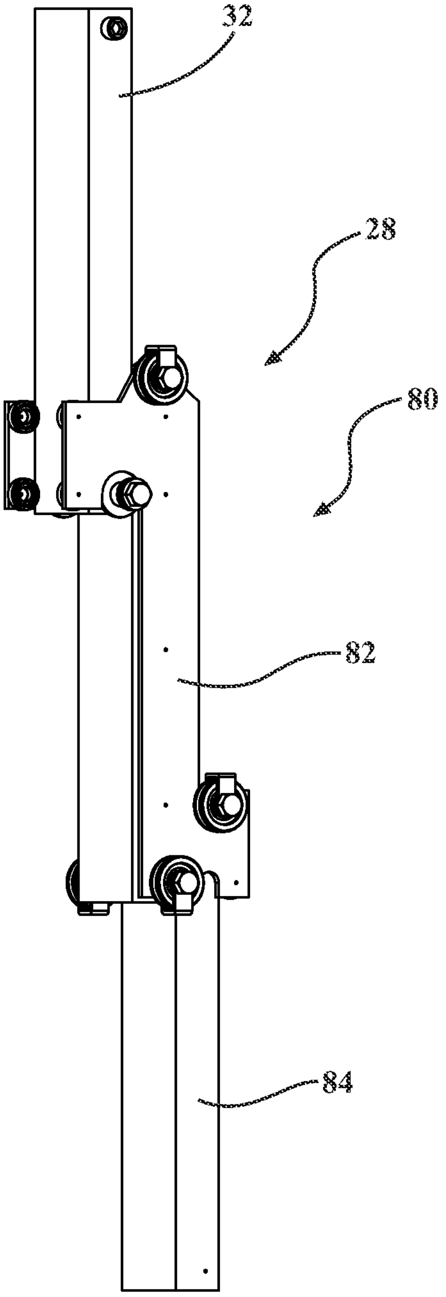
FIG. 6 is a perspective view of the upper slide assembly in the extended configuration.
Figure 7:
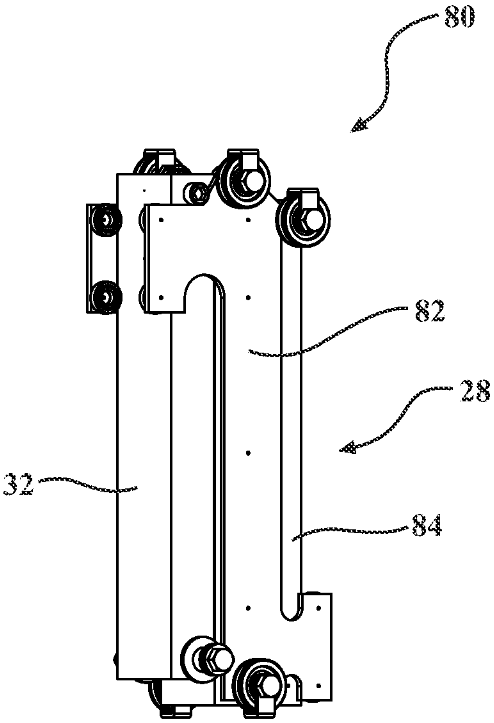
FIG. 7 is a perspective view of the upper slide assembly in the collapsed configuration.
Figure 8:
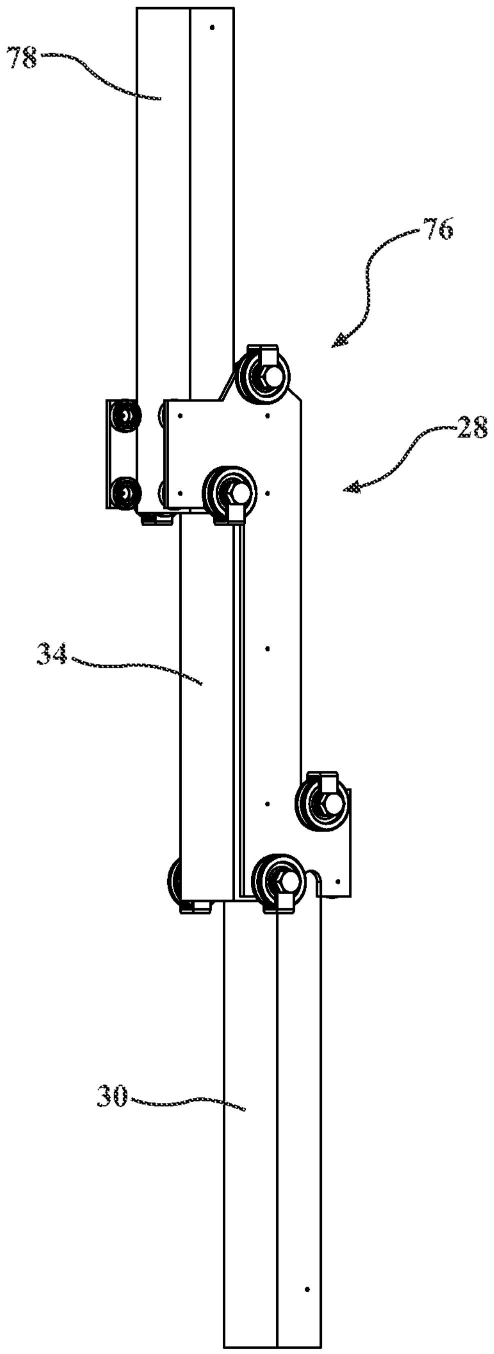
FIG. 8 is a perspective view of the lower slide assembly in the extended configuration.
Figure 9:
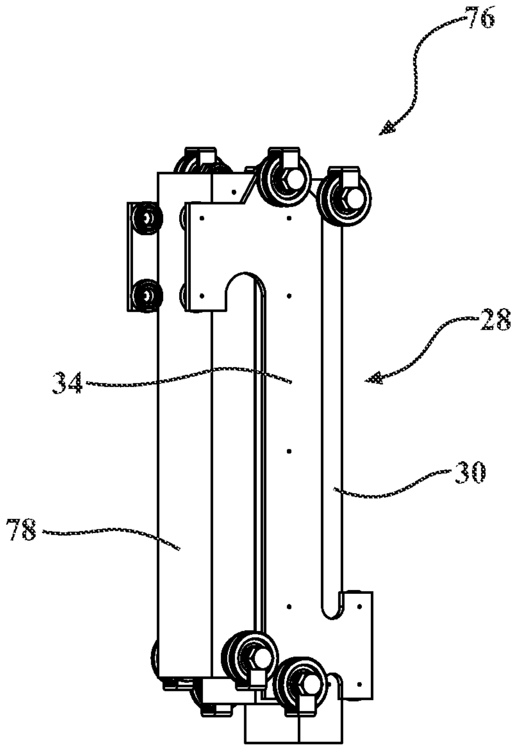
FIG. 9 is a perspective view of the lower slide assembly in the collapsed configuration.

The first linkage 34 and the base support 30 of the lift mechanism 28 may be incorporated into a lower slide assembly 76, as shown in FIGS. 8 and 9. The lower slide assembly 76 may further include the first intermediate support 78 coupled to the first linkage 34. Moreover, the platform support 32 of the lift mechanism 28 may be incorporated into an upper slide assembly 80, as shown in FIGS. 6 and 7. The upper slide assembly 80 may further include the second linkage 82 coupled to the platform support 32 and the second intermediate support 84 coupled to the second linkage 82. The first intermediate support 78 of the lower slide assembly 76 and the second intermediate support 84 of the upper slide assembly 80 may be fixedly coupled to one another. Fixed coupling of the first intermediate support 78 and the second intermediate support 84 provides a strong connection between the lower slide assembly 76 and the upper slide assembly 80.

Additionally, the lower slide assembly 76 is moveable between a collapsed configuration, as shown in FIG. 9, and an extended configuration, as shown in FIG. 8. In the collapsed configuration, the first intermediate support 78, the first linkage 34, and the base support 30 are proximate to the base 22 and adjacent to one another. As a non-limiting example, the lower slide assembly 76 may telescope. In the extended configuration, the first intermediate support 78, the first linkage 34, and the base support 30 are spaced from one another away from the base 22. Further, the upper slide assembly 80 is moveable between a collapsed configuration, as shown in FIG. 7, and an extended configuration, as shown in FIG. 6. In the collapsed configuration, the second intermediate support 84, the second linkage 82, and the platform support 32 are proximate to the platform 24 and adjacent to one another. As a non-limiting example, the upper slide assembly 80 may telescope. In the extended configuration, the second intermediate support 84, the second linkage 82, and the platform support 32 are spaced from one another away from the platform 24.

The cable 42 may have a serpentine arrangement relative to the first pulley 36, the second pulley 38, and the third pulley 86. Moreover, it the serpentine arrangement of the cable 42 may also extend to the fourth pulley 88, the fifth pulley 90, the sixth pulley 92, and/or the seventh pulley 94. In a non-limiting embodiment, the cable 42 extends from the drive mechanism 40 toward the first pulley 36, wraps partially around the first pulley 36 and extends toward the second pulley 38, wraps partially around the second pulley 38 and extends toward the third pulley 86, wraps partially around the third pulley 86 and extends toward the fourth pulley 88, wraps partially around the fourth pulley 88 and extends toward the fifth pulley 90, wraps partially around the fifth pulley 90 and extends toward the sixth pulley 92, wraps partially around the sixth pulley 92 and extends toward the seventh pulley 94, and wraps partially around the seventh pulley 94 and extends to the fixation point 44.

Each connection between adjacent components of the lift mechanism 28—for example, the connection between the base support 30 and the first linkage 34, the connection between the first linkage 34 and the intermediate support 78, the connection between the intermediate support 78 and the second linkage 82, or the connection between the second linkage 82 and the platform support 32—may include adjacent pulleys which assist in forming the serpentine arrangement. More specifically, the cable 42 may wrap partially around the first pulley 36 on the base support 30 and the second pulley 38 on the first linkage 34 to form a first serpentine arrangement. The first serpentine arrangement assists in exerting a force on the first linkage 34 in the first direction. The cable 42 may also wrap partially around the third pulley 86 on the first linkage 34 and the fourth pulley 88 on the intermediate support 78 to form a second serpentine arrangement. The second serpentine arrangement assists in exerting a force on the intermediate support 78 in the first direction. The cable 42 may further wrap partially around the fifth pulley 90 on the intermediate support 78 and the sixth pulley 92 on the second linkage 82 to form a third serpentine arrangement. The third serpentine arrangement assists in exerting a force on the second linkage 82 in the first direction. The cable 42 may further wrap around the seventh pulley 94 on the second linkage 82 and be fixed to the fixation point 44 on the platform support 32 to form a fourth serpentine arrangement. The fourth serpentine arrangement assists in exerting a force on the platform support 32 in the first direction. The serpentine arrangement, as described herein, may include some or all of the first serpentine arrangement, the second serpentine arrangement, the third serpentine arrangement, and the fourth serpentine arrangement.

It is also to be appreciated that the lift mechanism 28 may include a duplicate cable for redundancy and increased safety. To assist in moving the lift mechanism 28 from the extended configuration to the collapsed configuration, the lift mechanism 28 may further include a second cable 42 fixedly coupled relative to the platform support 32, the platform 24, or the like which may be pulled, either by hand, by the drive mechanism 40, or by a separate drive mechanism to move the lift mechanism 28 to the collapsed configuration. Moreover, the lift assembly 20 may further include an accumulator, optionally in fluid communication with a normally closed valve and optionally in a closed fluid loop, which prevents the platform 24 from moving too quickly toward the base 22 in the event of failure of the cable 42.

The drive mechanism 40 preferably includes an electric motor, such as a DC motor. It is also to be appreciated that the drive mechanism 40 may include several electric motors. As a non-limiting example, the drive mechanism 40 may include the motor arrangement as disclosed in U.S. Provisional Application No. 63/406,111, which is incorporated by reference in its entirety. It is therefore to be appreciated that the lift assembly 20 may be electrically driven only, without a need for hydraulic or pneumatic actuation.

In the raised position, a distance between the base 22 and the platform 24 may be about 20 inches to about 60 inches, about 25 inches to about 55 inches, about 30 inches to about 50 inches, about 30 inches to about 45 inches, about 30 inches to about 40 inches, about 30 inches to about 38 inches, about 35 inches, or about 33 inches. Although not required, the lift assembly 20 may be installed on a vehicle, such as a Humvee or the bed of a truck. The lift assembly 20 may be bolted in place relative to the vehicle. The lift assembly 20 may be used to lift radar, weapon systems including those which use projectiles or lasers, or anti-drone devices.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A lift assembly comprising:
- a base;
- a platform moveable relative to said base between a raised position and a lowered position;
- a scissor mechanism coupled to said base and to said platform to move said platform relative to said base;
- a lift mechanism coupled to said base and said platform to move said platform to said raised position, said lift mechanism comprising:
  - a base support mounted to said base and extending from said base toward said platform;
  - a platform support mounted to said platform and extending from said platform toward said base;
  - a first linkage supported by said base support and coupled to said platform support; and
  - a first pulley supported by said first linkage;
- a drive mechanism supported by said base; and
- a cable extending from said drive mechanism, wrapped at least partially around said first pulley, and fixed relative to said platform support;
- wherein said cable is configured to be tensioned by said drive mechanism such that said lift mechanism moves said platform to said raised position.

2. The lift assembly of claim 1, wherein said cable is fixed to said platform support at a fixation point, and wherein said cable extends from said fixation point toward said platform.

3. The lift assembly of claim 1, wherein said platform moves along a vertical axis in a first direction to said raised position and in a second direction to said lowered position, and wherein said cable is configured to exert a force on said platform support in said first direction when tensioned.

4. The lift assembly of claim 1, wherein said lift mechanism is capable of holding said platform in said raised position without assistance from said scissor mechanism.

5. The lift assembly of claim 1, wherein said lift mechanism has a collapsed configuration associated with said lowered position of said platform, wherein said lift mechanism has an extended configuration associated with said raised position of said platform, wherein in said collapsed configuration at least one of said platform support and said base support are adjacent to said first linkage, and wherein in said extended configuration said platform support, said base support, and said first linkage are spaced from one another between said base and said platform.

6. The lift assembly of claim 1, wherein said lift mechanism further comprises a second pulley supported by said first linkage and a third pulley supported by said first linkage, and wherein said cable wraps at least partially around said second pulley and said third pulley.

7. The lift assembly of claim 6, wherein said base extends along a longitudinal axis, and wherein said first pulley, said second pulley, and said third pulley are spaced from one another along said longitudinal axis such that said second pulley is disposed axially along said longitudinal axis between said first pulley and said third pulley.

8. The lift assembly of claim 1, wherein said lift mechanism further comprises a second linkage supported by said platform support and coupled to said base support and said first linkage.

9. The lift assembly of claim 8, wherein said lift mechanism further comprises a first additional pulley supported by said second linkage and a second additional pulley supported by said second linkage, and wherein said cable wraps at least partially around said first additional pulley and said second additional pulley.

10. The lift assembly of claim 9, wherein said cable extends from said second additional pulley, away from said platform, and toward said platform support where said cable is fixed to said platform support at a fixation point.

11. The lift assembly of claim 8, wherein said platform moves along a vertical axis in a first direction to said raised position and in a second direction to said lowered position, and wherein said cable is configured to exert a force on said second linkage in said first direction when tensioned.

12. The lift assembly of claim 8, wherein said lift mechanism further comprises an intermediate support supported by said first linkage and said second linkage.

13. The lift assembly of claim 12, wherein said lift mechanism further comprises a first additional pulley supported by said intermediate support and a second additional pulley supported by said intermediate support, and wherein said cable wraps at least partially around said first additional pulley and said second additional pulley.

14. The lift assembly of claim 13, wherein said lift mechanism has a collapsed configuration associated with said lowered position of said platform, wherein said lift mechanism has an extended configuration associated with said raised position of said platform, wherein in said collapsed configuration said base support, said first linkage, said second linkage, and said intermediate support are proximate to said base and adjacent to one another, and wherein in said extended configuration said base support, said first linkage, said second linkage, and said intermediate support are spaced from one another between said base and said platform.

15. The lift assembly of claim 12, wherein said platform moves along a vertical axis in a first direction to said raised position and in a second direction to said lowered position, and wherein said cable is configured to exert a force on said intermediate support in said first direction when tensioned.

16. The lift assembly of claim 12, wherein said intermediate support is further defined as a first intermediate support and a second intermediate support, wherein said lift mechanism further comprises a first additional pulley supported by said first intermediate support and a second additional pulley supported by said second intermediate support, and wherein said cable wraps at least partially around said first additional pulley and said second additional pulley.

17. The lift assembly of claim 16, wherein said first intermediate support is fixed to said second intermediate support.

18. The lift assembly of claim 2, wherein said fixation point is further defined as a projection which said cable at least partially wraps around.

19. The lift assembly of claim 1, wherein in said raised position a distance between said base and said platform is between about 20 inches to about 60 inches.

20. The lift assembly of claim 1, wherein said scissor mechanism includes a pair of opposing scissor supports pivotable about a pivot point, with one of said pair of opposing scissor supports fixed relative to said base and the other of said pair of opposing scissor supports moveable relative to said base.

* * * * *